United States Patent
Robb

[15] 3,646,415
[45] Feb. 29, 1972

[54] SYSTEM FOR STARTING INDUCTION MOTORS WITH SELF-EXCITATION

[72] Inventor: David D. Robb, Ames, Iowa
[73] Assignee: Iowa State University Research Foundation, Inc., Ames, Iowa
[22] Filed: Dec. 16, 1970
[21] Appl. No.: 98,757

[52] U.S. Cl. ............................. 318/229, 318/418, 318/419, 318/430
[51] Int. Cl. ...................................................... H02p 1/26
[58] Field of Search ................... 318/228, 229, 418, 419, 430

[56] References Cited

UNITED STATES PATENTS

| | | | |
|---|---|---|---|
| 1,096,922 | 5/1914 | Korndorfer | 318/419 X |
| 2,542,296 | 2/1951 | Storsand | 318/229 |
| 2,247,073 | 6/1941 | Thompson | 318/229 |

OTHER PUBLICATIONS

Hyde, Marbury, Solving a Motor Starting Voltage Problem, Westinghouse Engineer, May 1944, pp. 70–73.

Primary Examiner—Gene Z. Rubinson
Attorney—Dawson, Tilton, Fallon & Lungmus

[57] ABSTRACT

A polyphase induction machine has a balanced polyphase shunt capacitor bank connected to the stator. In starting as a motor, the stator and capacitor bank are supplied with reduced line voltage by means of a transformer, and the motor is allowed to accelerate until it reaches maximum (and nearly) synchronous speed. Then, the motor is disconnected from the source and permitted to coast, whereupon there is a building up of stator voltage by self-excitation. When the phase and amplitude of the self-excited voltage are approximately equal to the phase and amplitude of the line voltage, the stator is connected directly to the line and the transformer and excitation capacitor are disconnected. The starting is accomplished with minimal dip in line voltage.

6 Claims, 11 Drawing Figures

PATENTED FEB 29 1972
3,646,415
SHEET 1 OF 2
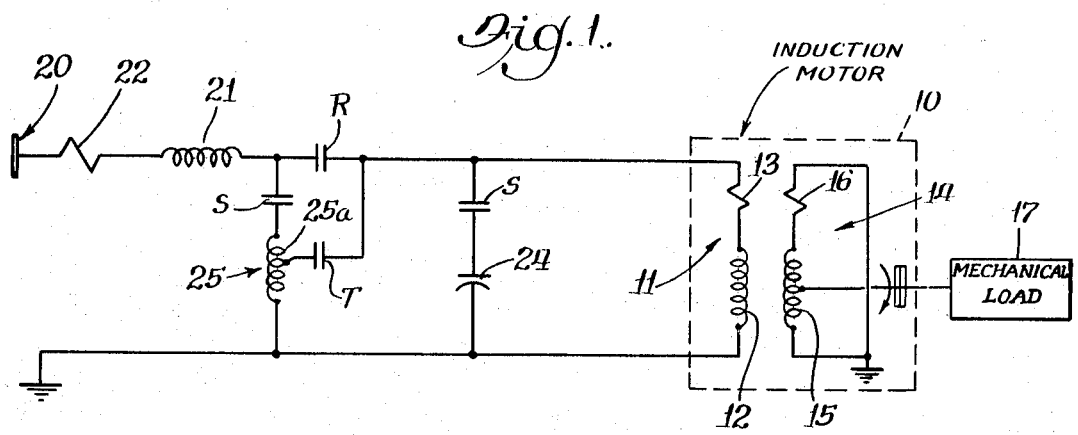
Fig. 1.
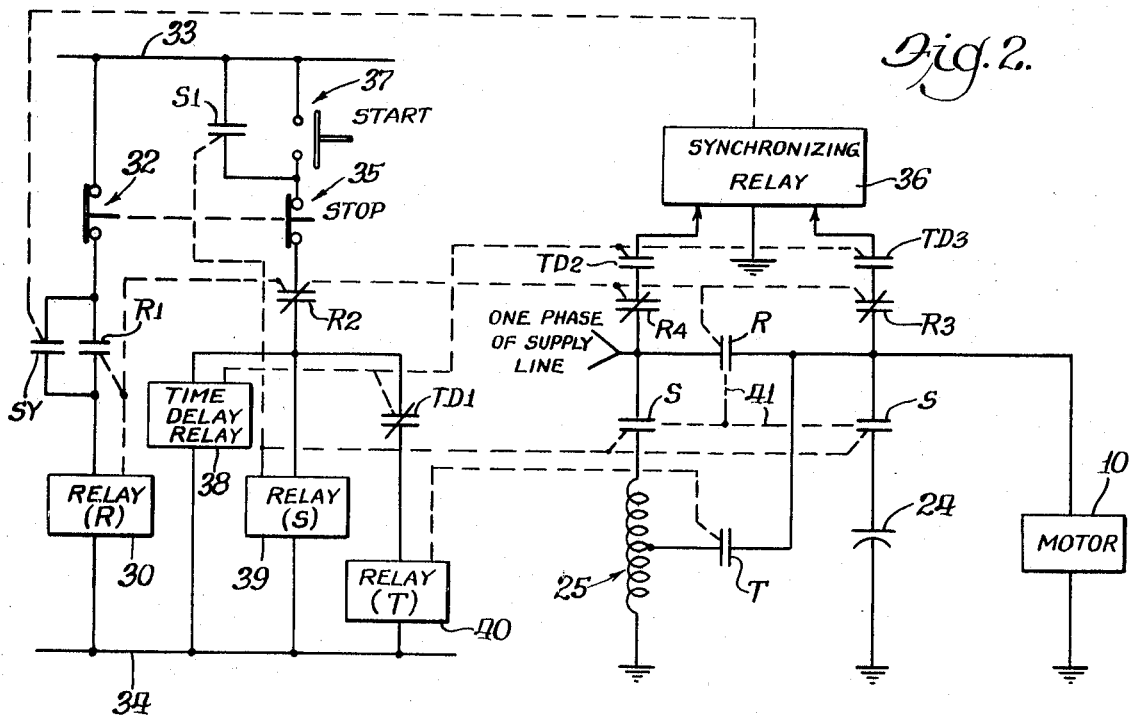
Fig. 2.
| SEQUENCE OF OPERATION | | | |
|---|---|---|---|
| STEP | CONTACTORS | | |
| | R | S | T |
| 1 | OPEN | CLOSED | CLOSED |
| 2 | OPEN | CLOSED | OPEN |
| 3 | CLOSED | CLOSED | OPEN |
| 4 | CLOSED | OPEN | OPEN |
Fig. 3.
Inventor:
David D. Robb
By: Dawson, Tilton,
Fallon & Lungmus
Attys.

FIG. 4A  $I_{aL}$ PU CURRENT
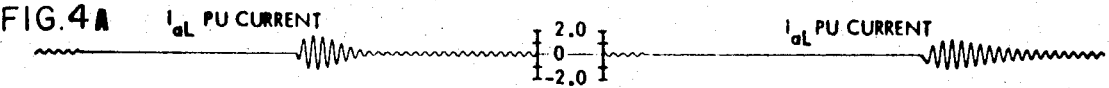
$I_{aL}$ PU CURRENT

FIG. 4B  $|v'_{aL}|$ PU VOLTAGE
$|v'_{aL}|$ PU VOLTAGE

FIG. 4C  $|v'_{bL}|$ PU VOLTAGE
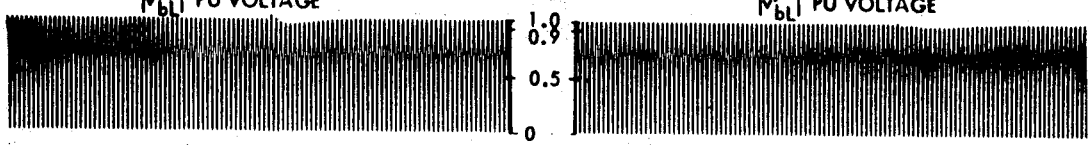
$|v'_{bL}|$ PU VOLTAGE

FIG. 4D  $|v'_{cL}|$ PU VOLTAGE
$|v'_{cL}|$ PU VOLTAGE

FIG. 4E  $v_{as}$ PU VOLTAGE
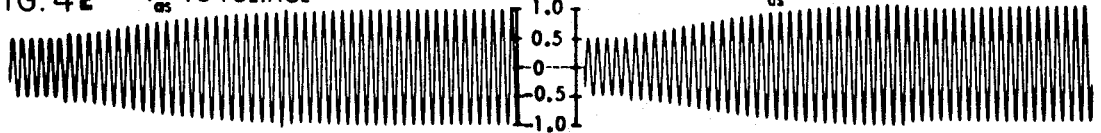
$v_{as}$ PU VOLTAGE

FIG. 4F  $I_{as}$ PU CURRENT
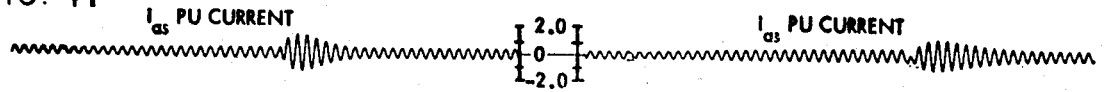
$I_{as}$ PU CURRENT

FIG. 4G
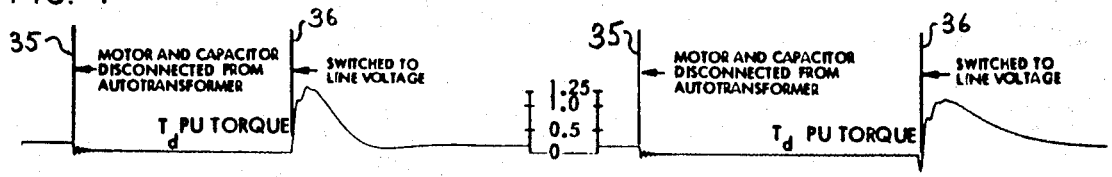
$T_d$ PU TORQUE

FIG. 4H  $(\omega_r/\omega_e)$ PU SPEED
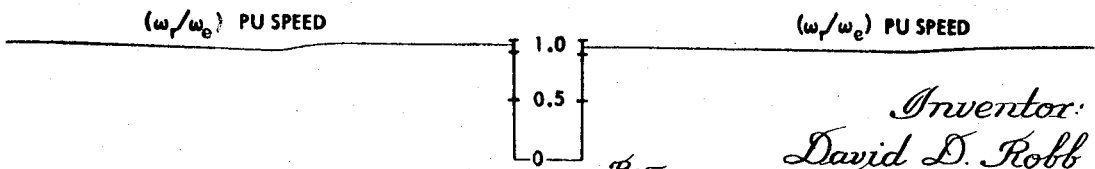
$(\omega_r/\omega_e)$ PU SPEED Inventor:
David D. Robb
By Dawson, Tilton, Fallon & Lungmus
Attys.

SYSTEM FOR STARTING INDUCTION MOTORS WITH SELF-EXCITATION

BACKGROUND OF THE INVENTION

1. Field of the Invention

The present invention relates to electrical induction machinery. More particularly, it relates to a system, including apparatus and method, for starting induction motors, and it has particular advantages in starting large polyphase induction motors under light initial loading.

Large induction motors frequently cannot be started by connecting the stator directly to the supply line even if the motors are lightly loaded because to do so would cause a large fluctuation or "dip," as it is sometimes called, in the line voltage because of the large transient current that would result in a direct connection.

2. Prior Systems

Although not currently used in practice, one way to start large induction motors would be to use a variable autotransformer with the stator of the motor connected to the variable terminal of the autotransformer, initially at a much reduced voltage. If the motor is a three-phase induction motor, a three-phase autotransformer is used. Since the present invention is primarily concerned with starting large induction motors and because the larger induction motors are ordinarily three-phase, the description of the invention will, for the most part, refer to three-phase induction motors, although persons skilled in the art will appreciate that the invention is not so limited. In using a variable autotransformer, the motor is started at a lower voltage and the applied terminal voltage is gradually increased to line voltage by varying the autotransformer. Various devices such as current meters may be used so that an operator does not permit the supply current to exceed a predetermined limit. In this case, the stator and line voltages are always in phase and the stator and line currents are always in phase.

A manually operated transformer-type starter that is used in practice consists of an autotransformer having a single reduced voltage tap for each phase, switching to full voltage is done manually by the operator at a time he feels is wise. Ordinarily such manual starters employ "open transition" switching—that is, the stator is disconnected from the transformer during the transition to full applied voltage. Since this switching is without synchronization, the transient current accompanying the switching may, by random chance, be larger than the motor starting current at full voltage because the self-induced stator voltage may be, in the worst case, 180° out of phase with the line voltage. Thus, the accompanying line voltage fluctuation may be more severe than had the motor been started by a direct connection to line voltage. Further, very large transient torques, of the order of 10 times the rated full load for the motor, may result from the unsynchronized switching to full line voltage.

It is desirable, of course, to have startup of large induction motors be independent of an operator's judgment, and systems are known for the automatic starting of induction motors. One such system which is currently supplied by manufacturers of motor control equipment is sometimes referred to as the "Korndorfer" motor starting method. In this method, the stator winding of each phase is connected to an intermediate tap of one phase of a three-phase autotransformer. The three phases of the autotransformer are connected by means of a contactor in a Y-array. The autotransformer is first connected across the line so that the motor is started at a reduced voltage. After a predetermined time or conversely, after the stator current has reduced to a predetermined level, the autotransformers are disconnected by disconnecting the Y-array so that a portion of each phase of the autotransformer acts as a reactance in series with each stator winding. Finally, each stator winding is directly connected to line voltage, and the autotransformer is disconnected. This is sometimes referred to as a "closed transition" starter system because the stator is always connected to the line, even though the connection may be via an autotransformer or a part of an autotransformer winding acting as an inductor.

SUMMARY OF THE INVENTION

In the present invention, a balanced polyphase capacitor bank is connected in parallel with the stator terminals, and this capacitor is sometimes referred to as an excitation capacitor. A three-phase autotransformer is first connected to the stator and capacitor via a tap to start the motor at a reduced voltage. After a predetermined time has lapsed (sufficient to permit the motor to achieve its maximum speed for that applied voltage), the motor and capacitor are disconnected from the autotransformer and the motor is permitted to coast. The excitation capacitor provides a return path for the stator magnetizing current. The disconnection of the stator and capacitor from the tap of the autotransformer may occur, as mentioned, after a preset time delay or it may occur at a predetermined speed or at a predetermined current.

While thus coasting, the self-excited voltage in the stator of the motor will increase while the speed of the motor reduces slightly. An automatic synchronizing relay sensing both the self-excited voltage of the motor as well as the line voltage then switches the motor directly to the line when these voltages are equal in magnitude and phase. While coasting, the frequency of the stator currents decreases to about 55 cycles per second, which facilitates switching to full line voltage at the proper phase and amplitude. Finally, the autotransformer and excitation capacitors are disconnected from the system, and the motor is left to run on full line voltage.

With this starting system when the motor is switched to full line voltage, we have found that transients in stator current and developed torque are always well within the rated torque range for the motor. In addition, the current and torque transients are not seriously affected by rather large differences (of the order of 15°) in the instantaneous phase between line voltage and the stator voltage; further, the operation of the system is not critically dependent upon variations in line and stator voltage magnitudes at the time of the synchronized switching.

The performance of the system has been found to improve as the combined inertia of the motor and load increases so that it is more advantageous in the starting of larger motors. That is, increased inertia reduces the maximum instantaneous transients in line current and developed torque. The maximum transient disturbances in the motor bus voltages are not significantly influenced by reasonable variations in phase differences between line and stator voltage at the time of switching nor in variations in the combined inertia of motor and load. The total coasting time while awaiting the synchronized switching to line voltage is of the order of 0.5 second. The preferred system is fully automatic, not requiring judgment on the part of an operator.

Other features and advantages of the present invention will be apparent to persons skilled in the art from the following detailed description of a preferred embodiment accompanied by the attached drawings.

THE DRAWING

FIG. 1 is a circuit schematic diagram of a single phase of a system for starting an induction motor according to the present invention;

FIG. 2 is a circuit schematic diagram, partially in functional block form, of a preferred system for starting an induction motor according to the present invention;

FIG. 3 is a table indicating the sequence of operations in starting an induction motor according to the systems of FIGS. 1 and 2; and FIGS. 4A–4H illustrate various per unit current, voltage and torque relationships during a starting cycle.

DETAILED DESCRIPTION

Turning then to FIG. 1, there is shown one phase of a three-phase starting system for an induction motor, the equivalent circuit for the single phase for the motor being enclosed within a dashed line 10. The induction motor 10 includes a stator 11, the equivalent circuit of which includes an inductance 12 and a resistance 13, and a rotor 14, the equivalent circuit of which includes an inductance 15 and a resistance 16. The output of the rotor 14 is mechanically coupled to a load schematically designated by reference numeral 17.

The voltage bus or supply line for the single illustrated phase is schematically illustrated at 20, and the equivalent circuit of the source also includes an inductance 21 and a resistance 22.

A capacitor 24 is connected across the terminals of the stator 11 in series with a first set of normally open contactor poles, designated S. An autotransformer 25 including a tap 25a has one terminal connected to ground or system common and another terminal connected by means of a second set of normally open contactor poles (also designated S) to the supply bus. The supply bus is coupled by means of a normally open contactor R to the stator of the motor 11. The tap 25a of the autotransformer 25 is connected by means of normally open contactor poles T to the stator 11 of the motor 10.

In operation, the first step is to connect the transformer 25 across the appropriate phase of the stator 11 of the motor 10 by closing both sets of contacts designated S as well as the contacts T. That is represented by Step 1 in the sequence of operations illustrated in the table of FIG. 3. Thus, the primary of the autotransformer 25 is connected across the supply line and the capacitor 24 and stator 11 are connected in parallel to the tap 25a of the autotransformer 25. The motor is thus started at a reduced voltage.

After the motor has come up to maximum speed and the stator current has fallen to a low steady state level, the contacts T are opened to remove the motor stator and the capacitor from the autotransformer, and the motor is left to coast. While the motor is coasting, the self-excited voltage in the stator will build up and the stator current will increase while the motor speed decreases slightly. At this time, of course, the contacts S are closed so that the capacitor 24 is connected across the stator 11 to provide a return path for stator current.

When the self-excited stator voltage reaches the same magnitude as the line voltage and the two are in phase, the contacts R are closed to connect the stator directly to the line (Step 3 of FIG. 3). This is the synchronized switching of the coasting motor directly to the line. Finally, the sets of contacts S are opened to remove the autotransformer 25 as well as the capacitor 24 from the line (Step 4 of FIG. 3), and the starting operation is thus completed.

We have found that variations in the phase angle at the time of switching between the line voltage and the stator voltage of up to about ±15° do not substantially affect operation. Further, differences of the order of 15 percent between the amplitude of the line voltage and the amplitude of the self-excited stator voltage do not appreciably affect operation. However, in practice, synchronized switching at exact line voltage and phase would not be difficult to achieve because the frequency of the stator voltages drops to about 55 Hz. whereas the line frequency remains at 60 Hz.

Although the illustration of FIG. 1 shows that the excitation capacitor 24 is connected directly across the winding for the illustrated phase of the motor, persons skilled in the art will appreciate that the invention is not so limited. That is, the polyphase motor windings may be connected in a Δ or in a Y-arrangement, and similarly, the capacitor bank may be connected in a Δ or a Y-arrangement independent of the manner in which the stator windings are connected. Thus, the capacitor bank may be connected in a Δ whereas the motor stator windings may be connected in a Y. It is only necessary that the capacitor bank be connected so as to permit the stator currents to circulate during the time when the motor is disconnected from the line. Ordinarily, this will take the form of a balanced polyphase capacitor bank connected in shunt with the stator winding.

Turning now to FIG. 2, there is shown a more detailed schematic diagram for starting an induction motor, again, only one phase of the motor and its associated control circuitry being shown. The single illustrated phase of the motor is generally designated by reference numeral 10. The excitation capacitor 24, autotransformer 25, and the contactors R, S and T are the same as shown in FIG. 1.

The contactor R is normally open, and it is in series with one phase of the line voltage. The contactor R is controlled by a relay designated 30 which also actuates contacts R1, R2, R3, and R4 in FIG. 2. The contacts R1 are normally open, and they are connected in series with one section 32 of a normally closed STOP switch and the coil of relay 30 across a control bus including lines 33 and 34. The first section of the STOP switch 32 is mechanically ganged with a second normally closed section of that switch designated 35. Also actuated by means of the relay 30 are two sets of normally closed contacts designated R3 and R4 which are connected to points respectively on either side of the contactor R and leading to the input of a synchronizing relay 36 having a balanced input and actuating normally open contacts SY which are connected parallel with the contacts R1. The relay 30 also controls normally closed contacts R2 which are connected in series with the second section of the STOP switch 35, a normally open START switch 37 and the coils of three relays (designated 38, 39, and 40) across the control bus 33, 34. The coils of the relays 38, 39 and 40 are connected in parallel. The relay 38 is a time delay relay of the type which actuates its contacts only after a preset and predetermined time after the coil of that relay has been energized. The relay 39 controls the actuation of the contactors S as well as the normally open contacts S1. The relay 40 controls operation of the contactor T. Further, as schematically illustrated by the chain line 41, the contactors R and S are mechanically interlocked such that the contactor S opens after the contactor R closes.

The time delay relay 38 actuates a set of normally closed contacts TD1 connected in series with the coil of relay 40 as well as a pair of sets of normally opened contacts TD2 and TD3 connected in series respectively with the contacts R4 and R3 in the input lead to the synchronizing relay 36.

Although the illustrated control system was manually operated, momentary contact START and STOP pushbuttons, persons skilled in the art will appreciate that other devices may be substituted for these pushbuttons such as pressure switches, liquid level switches, thermostats, etc., which will perform equivalent functions and thereby render the system fully automatic.

In operation of the system of FIG. 2, an operator first pushes the START pushbutton 37 which will cause all of the coils of the relays 38, 39 and 40 to be energized by the control bus 33, 34 since the contacts R2 and TD1 are normally closed. Immediately thereafter relay 39 closes contacts S1 to electrically lock in the coils of relays 38, 39 and 40. The relay 39 also closes the contactors S,S. The closing of these contactors connects the primary of the autotransformer 25 across the supply line and also connects the excitation capacitor 24 to the stator of the motor 10. At the same time, the relay 40 closes the contactors T which connects the parallel combination of the excitation capacitor 24 and motor stator to the secondary tap of the autotransformer 25 thereby energizing the motor at a reduced voltage. The motor will begin to accelerate and within a known time (depending upon the load) the motor will achieve maximum speed. At that time, as determined by the time delay relay 38 the contacts TD1 open to deenergize the coil of relay 40, and the contactors T thereupon open. Thus, the system is at step 2 in the sequence of FIG. 3. Further, however, the synchronizing relay 36 has one input connected to the supply line by means of contacts TD2 and the other input connected to the motor stator by contacts TD3, although the synchronizing relay 36 is not energized at this time. The synchronizing relay 36 may be of the type commercially available as Type XA Automatic Synchronizer and Voltage Acceptor, Style No. 127D741 G4 manufactured by Westinghouse Electric Corporation. The function of the synchronizing relay 36, of course, is to close contacts SY when the amplitude and phase of a supply line voltage and the stator voltage for the motor 10 are within predetermined limits. As already mentioned, when the motor is disconnected from the autotransformer 25 by opening contacts T, the self-excited stator voltage will build up and the angular velocity of the motor will reduce slightly so that the frequency of the stator voltage reduces from 60 Hz. to 55 Hz. Operation of the system is now at step 3 of the sequence of FIG. 3.

When the synchronizing relay 36 senses that the phase and amplitude of the self-excited stator voltage is within the predetermined limits of the supply voltage, it will actuate the contacts SY thereby causing the coil of relay 30 to become energized through the normally closed pushbutton STOP switch section 32. When the relay 30 is energized, the contacts R1 are closed to lock in the coil of relay 30, and, at the same time, contacts R2, R3 and R4 are opened to disconnect the input of the synchronizing relay 36 and to deenergize the coils of relays 38 and 39. The coil of relay 40 will already have been deenergized by opening of the contacts TD1. The relay 30 also closes the contactor R which connects the motor stator directly to the supply line. When the contactor R opens, the previously mentioned interlock causes the contactors S,S to open and the system thereafter operates according to step 4 of the sequence of FIG. 3. An operator may shut down the system by pressing the STOP pushbutton.

In the embodiment illustrated in FIG. 2, the disconnecting of the motor from the tap of the autotransformer 25 occurs after a predetermined lapse of time caused by the time delay relay 38. This time delay, as has already been mentioned, is sufficient to insure that the motor has achieved maximum speed—that is, the synchronous speed of the motor less slip speed. However, this disconnecting of the motor from the tap of the autotransformer may also be occasioned by sensing line current or stator current. For example, a current relay sensing line current or stator current would become energized after the sensed current had fallen to a predetermined rms value thereby indicating that the motor has achieved maximum speed. Further, this disconnecting of the motor from the autotransformer tap could also be achieved by means of a device, such as a tachometer, sensing motor speed and generating a signal when the motor has reached maximum speed to disconnect the stator from the autotransformer.

Turning now to the diagrams of FIGS. 4A—H, the vertical represents "per unit" or normalized values of the various system parameters, and the horizontal axis represents time. The graphs are arranged so that time is common to each set of graphs. Both graphs (i.e., left and right sections) represent an instantaneous phase difference at the time of switching between line and the self-excited voltage of 5 electrical degrees. The combined inertia constant of motor and load is 0.67 per unit for the left-hand set of graphs, and the right-hand set of graphs are for a combined inertia constant of 1.50 per unit. Graph 4A represents one phase of line current ($i_{aL}$). Graphs 4B–4D represent absolute values of the line-to-neutral voltages. Graph 4E is the self-excited stator voltage for one phase. Graph 4F shows one phase of stator current. Graph 4G shows developed torque; and graph 4H shows the per unit motor speed, i.e., the ratio of rotor angular velocity to the synchronous speed.

As seen in graph 4G, reference numeral 35 indicates the time at which the motor and excitation capacitor 24 are disconnected from the autotransformer 25 by opening the contacts T. At this time, the per unit speed (which is also the ratio of the angular velocity of the rotor to the radian frequency of the distribution system) is close to synchronous speed. The per unit stator current (represented by FIG. 4F) has reached a steady state, as has the per unit stator voltage (FIG. 4E).

As seen in graph 4H, as the motor coasts, the per unit speed reduces slightly, whereas the per unit stator voltage (FIG. 4E) increases as does the per unit stator current (FIG. 4F). During coasting, of course, there is no line current (FIG. 4A). At the time that the stator is switched to the line voltage as indicated by reference numeral 36 in FIG. 4G, the line voltage and the stator voltage are in phase and of equal magnitude. There are slight fluctuations in the line voltage (FIGS. 4B, 4C, and 4D show the line voltage fluctuations) and there is a corresponding increase in the motor torque (FIG. 4G). The line current increases, and gradually, the per unit speed increases back to normal. However, it will be appreciated that the line voltage fluctuation is minimal and that the increase in line current is substantially reduced.

Having thus described in detail a preferred embodiment of the invention, persons skilled in the art will be able to substitute equivalent elements for those which have been disclosed and to otherwise modify the illustrated system while continuing to practice the principle of the invention and it is, therefore, intended that all such modifications and equivalents be covered as they are embraced within the spirit and scope of the appended claims.

I claim:

1. A system for starting a polyphase induction motor having a stator and a rotor comprising: voltage transformer means for connecting the stator of said motor to line voltage at a reduced voltage, a polyphase excitation capacitor bank connected in parallel with said stator of said motor, first circuit means associated with said motor for disconnecting said motor and said capacitor bank from said voltage transformer means after said motor has come to speed under said reduced voltage, synchronizing switching means for switching said stator and capacitor bank directly to said line when the amplitude and phase of the self-excited voltage of said stator has come within a predetermined limit relative to said line voltage, and second circuit means for thereafter disconnecting the transformer means and said capacitor bank from said motor and said line.

2. The system of claim 1 wherein said first circuit means includes preset time delay means for disconnecting said stator and said capacitor bank from said voltage transformer means a predetermined time after said stator has been initially energized whereupon the line current will have fallen to a steady state value and the speed of said motor will have reached a maximum value.

3. The system of claim 1 wherein said first circuit means includes current sensing means for disconnecting said stator and said capacitor bank from said voltage transformer means when the line current falls to a predetermined value.

4. The system of claim 1 wherein said second circuit means comprises means for sensing the speed of said motor for disconnecting said stator and said capacitor bank from said voltage transformer means when the speed of said motor has reached a predetermined value.

5. The system of claim 1 wherein said synchronizing switching means includes an automatic synchronizing relay having a pair of input terminals; third circuit means responsive to said time delay means for connecting said input terminals of said synchronizing relay respectively to said line voltage and to said stator voltage when said stator is disconnected from said line voltage; and fourth circuit means responsive to said synchronizing relay for connecting said stator to said line when the amplitudes of the self-excited stator voltage and said line voltage and the phases of said stator voltage and said line voltage are within predetermined tolerance limits.

6. A method of starting a large induction motor having a polyphase stator and rotor comprising: providing a polyphase excitation capacitor bank connected in parallel with the motor stator, connecting each phase of said stator to a reduced line voltage, then permitting the motor to reach maximum speed, then disconnecting said stator and capacitor bank from said reduced voltage and permitting said motor to coast, the current in said stator circulating through said excitation capacitor bank, then switching said stator directly to said line when the magnitude and phase of the self-excited stator voltage are within predetermined limits of the magnitude and phase respectively of the line voltage.

* * * * *